Dec. 15, 1931. J. BLONDIN 1,836,437
IRREVERSIBLE CONTROL FOR AIRCRAFT CONTROLS
Filed Sept. 16, 1929
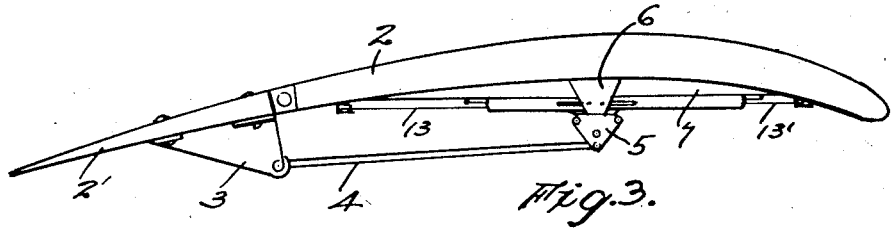
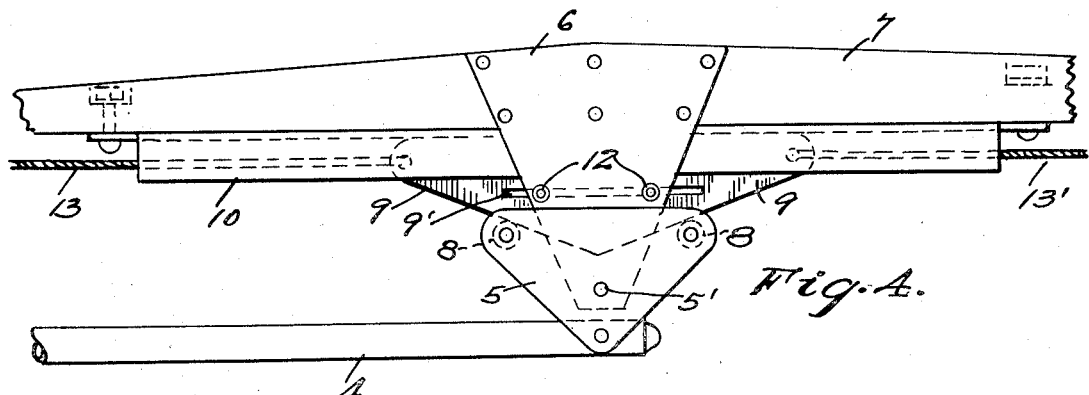
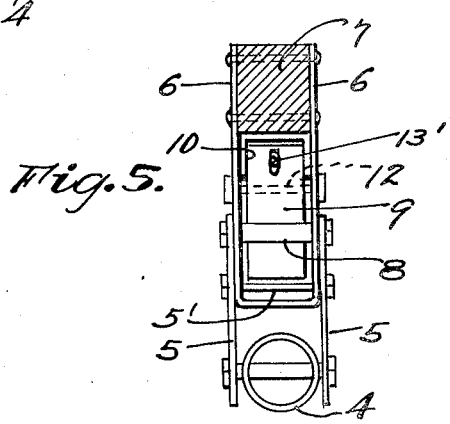
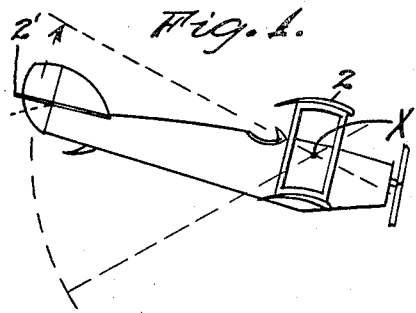
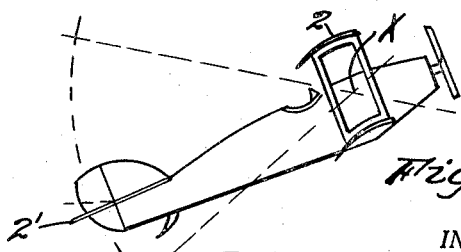
INVENTOR,
Joseph Blondin,
BY
ATTORNEY.

Patented Dec. 15, 1931

1,836,437

UNITED STATES PATENT OFFICE

JOSEPH BLONDIN, OF LOS ANGELES, CALIFORNIA

IRREVERSIBLE CONTROL FOR AIRCRAFT CONTROLS

Application filed September 16, 1929. Serial No. 392,846.

This invention relates to the means and mechanism employed in operating the control-surfaces of aircraft, particularly airplanes, and especially to a new development which I shall call "irreversible" controls for aircraft.

Conventional airplane controls consist of surfaces such as the ailerons, elevator and the rudder, and these are directly connected by cables or coupling-rods to the control levers, such as the "joystick" and rudder-bar. It will be seen, therefore, that after 26 years of development airplane controls are no further advanced than was the "1900-model" automobile, whose steering-control consisted likewise of a "tiller-bar", directly jointed to the vehicle's steering-knuckles, whereby all road-shocks, stresses and vibrations were transmitted to the chauffeur's hand. Automobile history records many fatal accidents due to severe road-shocks jerking such tiller-bars out of the hand of the chauffeur and throwing the machine, thus entirely out of control, into a ditch, or against a curb, tree, or telegraph pole, with consequent damage. The automobile did not become reasonably foolproof, or safe, until the hand-wheel "geared" steering-control was adopted, which indirectly, or through the medium of a worm-gear or equivalent mechanism, operated the vehicle wheels positively, while simultaneously absorbing all road-shocks, stresses, and vibrations, within its transmitting mechanism; or in other words, "locking" the hand-wheel "control" in place. The rutty automobile roads of early days were smooth indeed compared with the rutty (gusty) air-lanes frequently traveled by airplanes of today, and yet, conventional-type, present-day airplanes are still equipped with nothing better than a tiller-bar control. Not one day passes without its dismal toll of aviation fatalities, wherein the airplane is said suddenly to have "gone out of control", and to "tail-spin" or "nose-dive" into a fatal "crash". My analysis of the cause of such fatalities has prompted the present invention; and is as follows:—

Every object immersed in or supported upon a mobile fluid or gas (water or air), tends to oscillate thereon or therein around said object's center of gravity considered as a pivot or axis, regardless of its size or shape. In normal flight, a conventional airplane has its center of gravity located between the center and leading edge of its wings. Any extraneous force, such as an upward or downward gust of air acting upon the fuselage or tail of such a machine, will make it oscillate around said center of gravity. Also, it is apparent that an upward gust of air (a common condition when effecting a landing), when it acts either under the fuselage or tail of the airplane, not only throws the machine into a nose-dive, but, the upward "whip" of the fuselage and tail, depresses the elevator, accentuates and accelerates the nose-dive, and "loads" the elevator from above with a force (air pressure) in excess of the pilot's muscular capacity to overcome. This combination of diving-angle, plus accelerated nose-dive, plus an "air-locked" elevator, need endure but a few seconds of time. To the pilot, the result would be exactly the same as though his controls "jammed" by reason of a mechanical defect. Nothing could stop the machine's plunge, but the Earth and Destruction.

Any downward whip of the fuselage rearward, "stalls" the machine, raises the elevator with a force in excess of the pilot's muscular capacity to over-come, accentuates and accelerates the stall, which results finally in the machine dropping its nose, whipping upward in the rear again "jamming" (?) the elevator against the pilot's efforts at control, all ending with another press report of another machine which "buried its nose in the ground".

What I present now is the remedy for such conditions. It consists of an "irreversible" mechanism introduced between the control-stick proper and the elevator-surface, whereby the elevator will be always "locked" in position, and can "give" neither to upward nor downward gusts (or pressure) of air, but only to the voluntary control of the pilot. And of course, what I say here relative to the elevator, applies with equal logic to the ailerons, and rudder. Irreversible aileron and rudder surfaces in many cases would "dampen out" and prevent involuntary tail-spins.

With an irreversible control, all tendency of the airplane to "whip" up or down rearward of its center-of-gravity will be counteracted by the "locked" surface of the elevator, and this whip-action commonly so fatal, will be absorbed within the irreversible mechanism, and never tax the pilot's strength. In other words safety demands that we must apply an automobile-type steering-gear, "model 1929", to all airplane control-surfaces, in lieu of the antiquated "tiller-bar" of "model 1900".

An object of this invention, therefore, is to eliminate the dangers inherent in the conventional tiller-bar control of airplanes, and to make all aircraft control-surfaces operable by means of an "irreversible" mechanism interposed between the aviator's "joystick" or the rudder-bar, and said control-surfaces, whereby all air-gusts, pressures, vibrations, etc., shall be absorbed within said mechanism and shall not be transmitted to the aviator.

Any possible objection that such a device would rob the aviator of the sensation of increased pressure of the joy-stick against his hand, and thus prevent him from knowing he had lost balance—is without basis. Such an objection is on a par with the thought that actuated manufacturers of the first bicycles made in Germany. Said bicycles were provided with a semi-circular "table", graduated in degrees of arc, and attached to the steering-post, and the steering-bar carried a pointer which traversed said table and was intended to guide the rider out of a straight-away path, or in turning around corners. The rider was supposed to turn his handlebar with its attached pointer through a definite number of degrees of arc on said table, in order to properly make a 30°, 45°, or 90° turn. Of course it speedily developed that said table and pointer were superfluous; the rider's body being the best indicator of the "bank" necessary to make any turn successfully. During the World War, our Government was deprived of the services of thousands of men who failed to pass the "whirling chair" test for aviators, a test which was related to an effect taking place in "the vestibular canals of the inner ear" whenever a man loses balance. Today, we know that perhaps all of said "rejects" would have made excellent pilots. Neither "pressure of the joystick against a pilot's hand", nor "the condition of lymph within the vestibular canals of his inner ear", are as dependable a guide as the pilot's own body-position, which is proven by a simple test:—

Sit upon a chair in a natural relaxed position. While seated, have some-one tilt the chair by lifting the left side a scant inch off the floor. Note your consciousness that you are now inclined toward the right. Have the person tilt the chair by lifting the rear legs a scant inch off the floor, and again note your consciousness of the fact that you are now pitching forward. This amplitude of movement would correspond with a 12 inch movement at the wing-tip of an airplane with a wing-span of 30 feet. It is this extreme sensitiveness of the human body to changes of balance that can always be depended upon to make bicycle, motorcycle, and airplane control, possible and practical. Originators of the "whirling-chair" test today repudiate said device and now advocate dependence upon instrumental indications for the most efficient control. I claim that body-sensitiveness, as above cited, plus instrument indication, are the proper dependencies to be used by man in controlling air craft, and that stick-pressure against the hand can be entirely ignored for this purpose.

Conventional-type airplane control-surfaces "directly" operated by a control-stick and a rudder-bar through the medium of cable-and-pulley, or connecting-rod transmissions, are all defective in the sense that said control-surfaces cannot be adequately "stiffened" when said transmissions are used, because said control-surfaces are located so far distant from the joystick and the rudder-bar positions as to require long lengths of transmission cables, or rods, with numerous pulleys or bearings in between; and these lengths of cable are changeable, due to temperature effects of expansion and contraction, and stretching due to continued operations and wear, and all the pulleys or bearings are likewise subject to changes which result in so changing the length-relationship of said cable or rod transmissions, as to permit the control-surfaces considerable amplitude of movement or vibration commonly called "flutter"; a very grave defect tending to weaken not only the control-surface, but the whole wing-structure as well.

Another object of this invention, therefore, is to place the "locking" mechanism in immediate contact with the control-surface, and operate said mechanism in the customary way, either through cables or rods. These transmissions may now stretch or lengthen in any way, but whatsoever proportion of manual operation they transmit to the locking mechanism, will operate said mechanism positively, which in turn will operate the control-surface positively, and simultaneously maintain said control-surface in any position desired, without the possibility of air pressures reversing said position, or "fluttering" the said surface. Reference to automobile practice logically suggested the adoption of a standard automobile steering-wheel control "ad bloc", located in immediate contact and as integral elements of the joystick and the rudder-bar within the airplane fuselage; but the above mentioned consideration shows that such an adoption would not be practical, and why, and prompts this further elucidation opposing such a servile adoption:—an automobile steering-element would in fact have to be entirely re-designed to provide a different gear-ratio more adaptable to aircraft operation, because of the practical interest involved in retaining the conventional amplitude of joystick and rudder-bar movement, now standardized, so that any pilot might "feel at home" in operating any make of airplane.

A further object of this invention, therefore, is to provide an irreversible mechanism for operating airplane control-surfaces which shall be directly connected to the aileron. elevator, and rudder surfaces of said airplane, and which can be operated by conventional standard control-stick and rudder-bar elements, whose amplitude of movement for any given maneuver or purpose of control shall be exactly the same as those with which aviators are currently familiar.

My invention has for general objects the improvement of all existing control-operating elements for airplanes and aircraft generally, and which shall be superior in safety, positiveness of action, minimization of vibration, and general efficiency.

Other objects, advantages and features of construction, and details of means will be made manifest in the ensuing description of the herewith illustrative embodiment, it being understood that modifications, variations and adaptations may be resorted to within the scope, principle and spirit of the invention as it is hereinafter claimed.

Figure 1 is a side view of a conventional airplane in a diving attitude.

Figure 2 is a side view of such airplane in a stalling attitude.

Figure 3 is an end view of an airplane wing and its aileron, and applied irreversible control.

Figure 4 is a side view showing details of the control mechanism.

Figure 5 is an end and sectional view of the said mechanism.

The wing 2 is provided with an aileron 2' shown in neutralized position, that is—in normal flight position, and by the present means is locked so that it cannot move up or down except by pilot's manual action.

The aileron has a suitable horn 3 fixed thereto and is connected by a link-rod 4 to a "see-sawing" or oscillating rocker device here comprising a pair of triangular, parallel plates 5 which are mounted on a cross-pivot 5' provided in a bearing formed by a U-shaped bracket whose sides 6 are solidly fastened to a base-forming rib 7 of the wing structure 2.

The upper, remote corners of the tilting plates 5 carry transverse, interposed, parallel rollers 8 which are arranged to constantly bear and roll upon an actuator comprising a travelling, down-pointing, wedge 9 whose neutral or equalizing position is on center above the pivot 5'.

The wedge has longitudinal action on a suitable support here comprising a set of cross-pins 12 in the brackets 6 and passing into a cross-slot 9' in the wedge 9 which is guided in a downturned channel 10 secured suitably to the rib 7.

The wedge is reciprocated by means of pull cables 13 and 13'; the latter being the balance cable crossing the wing and connecting to the remote, coordinate aileron. Cable 13 is the control line and pulls the wedge 9 rearward and depresses the rear roller 8 and thus rocks the tilting device 5 and pulls the link-rod forward. Meanwhile, the forward roller 8 constantly tracks on the fore face of the wedge so that irreversibility is maintained by the wedge against the tilting device 5.

As the pull cable 13 is drawn back the balance cable 13' is pulled over and elevates the opposite aileron in the usual action, but at no time can the ailerons start a reverse stroke due to air gusts since the locking rollers 8 of each aileron are backed up by the travelling wedge 9.

As shown in Fig. 3 the U-bracket 6 is composed of side cheeks connected by a cross-bend just below the pivot 5'.

Figs. 1 and 2 illustrate the tilting actions of an airplane and the relative adverse deflection of the elevator 2' under air pressure resulting from the whipping actions of the fuselage about its center of gravity.

It will be noted that the lock wedge is introduced in the usual pull cables and takes the load reactions directly from the rocker 5 which in turn receives the reactions and load of the aileron 2' at all times regardless of the positions of the wedge so that the operator is relieved of the load feel and is required only to overcome the frictional resistance of the travelling wedge in order to rock the rocker 5. This is accomplished by the usual stroke amplitude of the joy stick and which is not over 60°. The wedge is of rather flat slope; being less than 45° and is irreversible in action on the rocker at any point in limit of wedge movement toward and from the pivot 5', the opposite slopes being of the same angle as to the base and forming supports for the rocker bearings 8 at all positions, thus eliminating play and consequent flutter.

What is claimed is:

1. In an airplane, an irreversible non-yielding mechanism interposed between the joystick and the relative control surfaces; and including a reciprocative traveller operative by the stick in its usual action amplitude and presenting reverse slopes, and a rocker means oscillated by said traveller and positively controlled thereby to eliminate lost motion during action or inaction of the traveller and being connected by stiff link and lever coupler to the respective control surface.

2. In airplane controls; control surfaces, and means irreversibly linking said surfaces to their respective hinge bases and thereby preventing any oscillations of said surfaces under the action of either their own weight, or air pressure, or maneuvering attitudes of the airplane proper said means including a wedge having reverse slopes and a rocker bearing on both slopes at all its positions.

3. In airplane controls; control joy-stick operated control cables surfaces linked by irreversible mechanism to their hinge base, which mechanism includes a traveller connected to the cables and operative only by and through the pilot's volition said surfaces being locked irreversibly by said traveller until changed by the pilot.

4. In airplane controls, control surfaces and irreversible mechanism linking said surfaces to their respective bases, and manual transmission devices operable by the pilot to actuate said mechanism; the latter including cables operative by stick action and connected to a reciprocative means; for maintaining irreversibility of the control surfaces continuously during any operative action by the pilot and independently of the pilot's action.

5. In airplane controls; control surfaces, irreversible mechanism located on bases of hinged control surfaces, and including travelling wedges each with reverse slopes and pilot operable means attached to said wedges to actuate the controls through said mechanism.

6. In airplane controls; control surfaces, irreversible mechanism including reciprocative wedges located on bases of hinged control surfaces, and pilot operable means connected directly to said wedges to actuate the controls through said mechanism; whereby to maintain said control surfaces constantly irreversible in themselves regardless of play developed in the control means.

7. In airplane controls; irreversible mechanism including rockers located on bases of hinged control surfaces, and pilot operable means including joy-stick operative wedges motivating the rockers to actuate the controls through said mechanism; whereby to maintain said control surfaces constantly irreversible in themselves regardless of play developed in the control means, and said rockers having constant support on the wedges against play in either direction whereby said irreversibility of movement shall prevent "flutter" or other destructive lost motion vibrations either in said surfaces or their connecting bases.

8. In airplane controls; irreversible mechanism for operating a control surface and comprising a fixed base, a connecting rod to a control surface, rocker means for reciprocating said rod, and a wedge having reverse slope on which the rocker bears and locking it irreversible as to the base, said wedge being operative by joy-stick actuated means with the usual amplitude of stick motion for the said surface.

9. In airplane controls; a control surface, and manual means for operating said control and for holding it irreversible in given position except by control action, and including a pull cable system, a traveller operative thereby and a device connected to the said surface and pivoted on a base and having constant operative bearing on said traveller to eliminate back-lash of the parts and being oscillative by the traveller to set the control at desired angle and immovable without change of the traveller.

10. In aerial craft controls; a control surface, a base to which it is hinged, a manual actuating device including pull and balance cables, and an irreversible mechanism including a rocker means connected to said control and an actuator connected to said cables and operative to tilt and to back-stop said means at every position of the parts.

11. In aerial craft control apparatus; a control surface hinged to a base part, a manual actuating system motivated in the amplitude of the usual stick stroke, an actuator reciprocated by said system and mounted on said base part and presenting reverse slope, cam faces, a rocker pivoted on said part and having constant engagement with both said slope faces and positively tilated in opposite directions, alternately, by and constantly firmly under control of said actuator, and a rigid, operative link connecting the surface and the rocker to reduce relative play of parts to a minimum; said actuator being mutually held against play by the set rocker so that slack in said system is negatived.

JOSEPH BLONDIN.